UNITED STATES PATENT OFFICE.

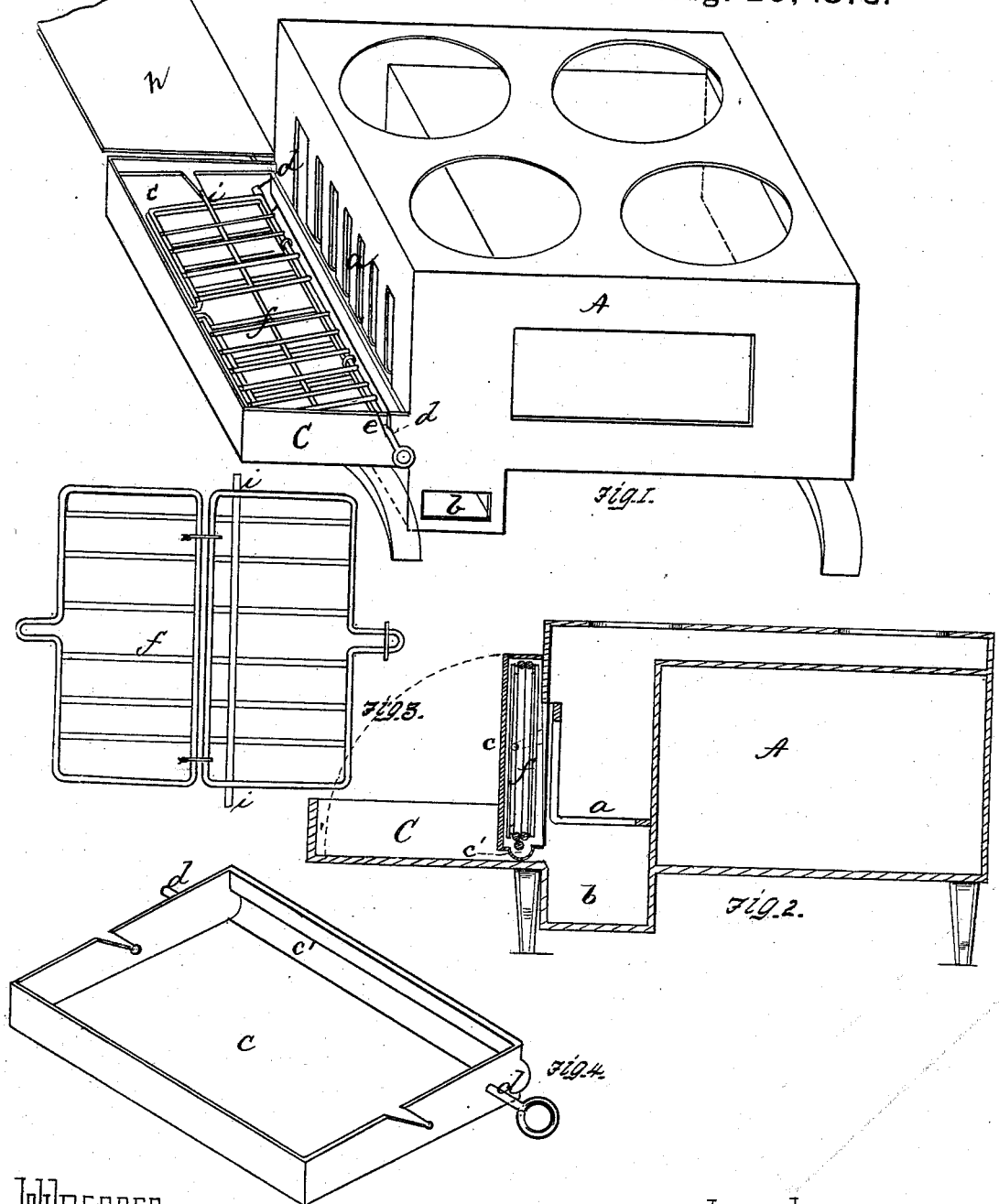

JOHN M. KILLIN, OF PITTSBURG, PENNSYLVANIA, ASSIGNOR TO FRANK S. BISSELL, OF SAME PLACE.

IMPROVEMENT IN BROILER ATTACHMENTS FOR STOVES.

Specification forming part of Letters Patent No. 207,286, dated August 20, 1878; application filed July 25, 1878.

*To all whom it may concern:*

Be it known that I, JOHN M. KILLIN, of Pittsburg, in the county of Allegheny and State of Pennsylvania, have invented a new and useful Improvement in Broiler Attachments for Stoves; and I do hereby declare the following to be a full, clear, and exact description thereof, reference being had to the accompanying drawing, forming part of this specification, in which—

Figure 1 is a perspective view of devices embodying my invention. Fig. 2 is a sectional view, the parts being in position for use in broiling or toasting. Figs. 3 and 4 are detail views.

Like letters refer to like parts wherever they occur.

My invention relates to certain attachments to stoves for use in broiling meats, toasting bread, and for like purposes.

I will now proceed to describe my invention, so that others skilled in the art to which it appertains may apply the same.

In the drawing, A indicates a range or cook-stove, provided with the usual grate $a$, which may have suitable doors and an ash-pit, $b$, directly below the grate. C represents the hearth, which may be a sunken hearth or otherwise, so formed as to receive a pan or like vessel, $c$, provided with pivots or bearings $d$ next the grate, in order that said receptacle may be turned up in front of grate $a$. To permit of the removal of receptacle $c$ for cleaning the same, one of the bearings should be slotted, as at $e$, or some similar construction should be adopted. $f$ indicates a broiler of any desired pattern, adapted to fit within the receptacle or pan $c$, and retained therein by pins $i$, which enter oblique slots in the sides of the receptacle.

When the devices are not in use the sunken hearth containing the same may be closed by a pivoted, swinging, or sliding cover, $h$.

When in use the broiler $f$ is removed from the pan or receptacle $c$. The article to be broiled is inserted in the usual manner, after which the broiler is replaced and the receptacle turned up into position before the front of grate $a$. The broiler can be removed from the pan and turned from time to time, if desired, to expose both sides of the meat or like article to the fire.

The pan $c$ will, of course, be provided with a drip trough or gutter, as at $c'$, and is, by preference, made of tin or tinned sheet-iron, in order that the reflection may be utilized in cooking the article.

Heretofore, though broilers have been combined with closed receptacles, drip-pans, &c., so far as I am aware said devices have had no permanent connection with the stove or range, but were adjusted therein when used, and removed and independently stored when not in use.

The advantages of my devices are the readiness with which they can be stored when not in use, their permanency, non-liability to be thrown down or displaced when in use, as well as their compactness and simplicity.

Another, and perhaps the most important, advantage is that the front of the stove is closed by the pan $c$ when in use, the same as if the usual doors were closed, thus preventing the admission of an excessive amount of cold air and the chilling of the oven and top of the stove, so that the use of the oven is not interfered with, as is often the case where the broilers now in use are employed.

Having thus described my invention, what I claim, and desire to secure by Letters Patent, is—

1. The combination, with a sunken or recessed stove-hearth, of a broiler, pivoted therein and adapted, in the manner described, to be turned up before the grate, substantially as and for the purpose specified.

2. The combination, with a range or stove, of the depressed hearth, a detachable drip-pan, and pivoted broiler, and the movable cover pivoted to the stove and adapted to inclose the broiler within the hearth for storage thereof, substantially as and for the purpose specified.

In testimony whereof I, the said JOHN M. KILLIN, have hereunto set my hand.

JOHN M. KILLIN.

Witnesses:
EDWARD B. ALSOP,
FRANCIS TORRANCE.